April 14, 1964
S. LIEBERMAN
3,128,619
METHOD OF AND APPARATUS FOR MONITORING FOR
FLOWING STREAM CONTENT
Filed March 24, 1961
2 Sheets-Sheet 1
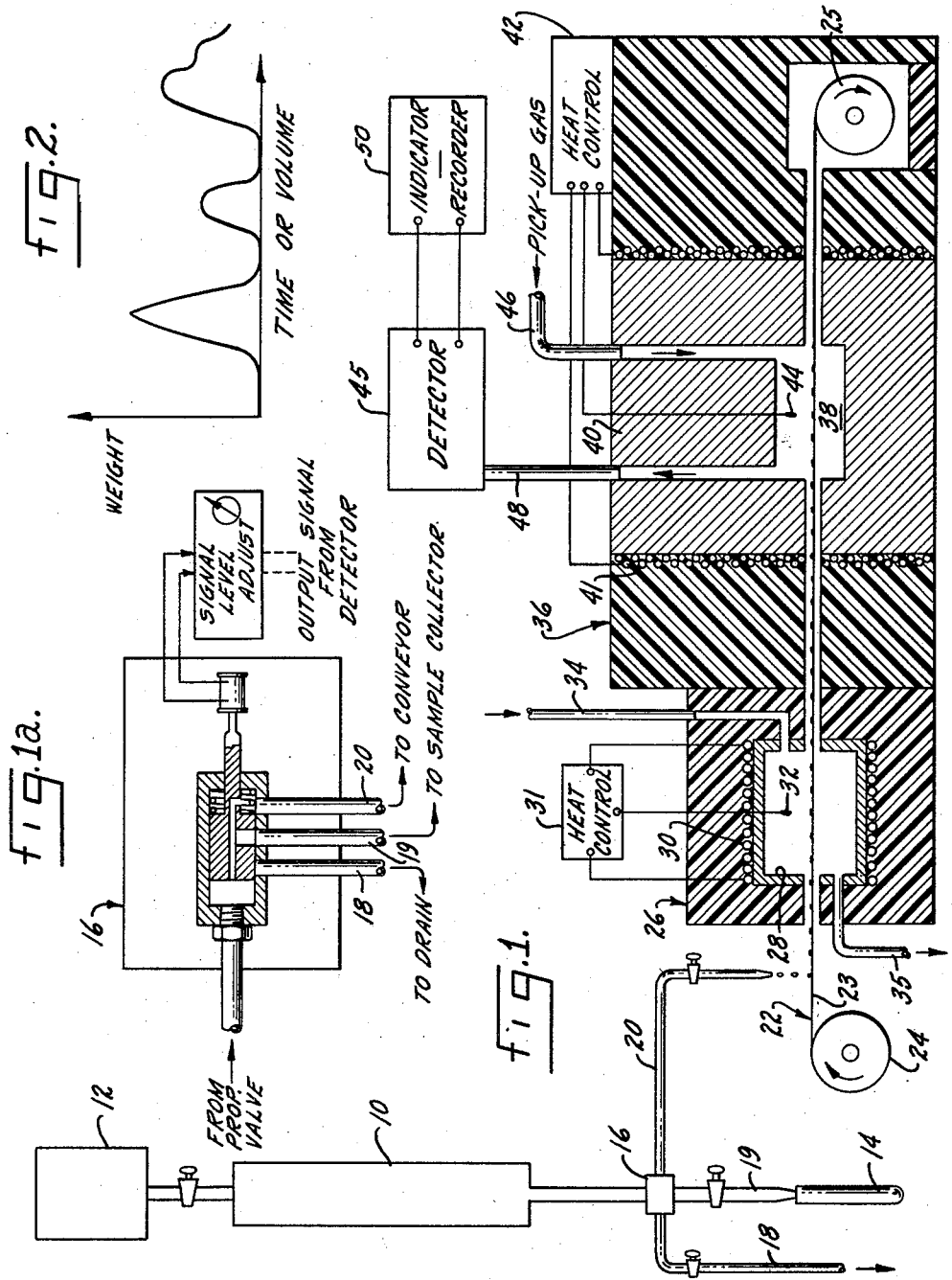
INVENTOR.
Seymour Lieberman,
BY Wolfe, Hubbard,
Voit & Osann
ATTORNEYS.

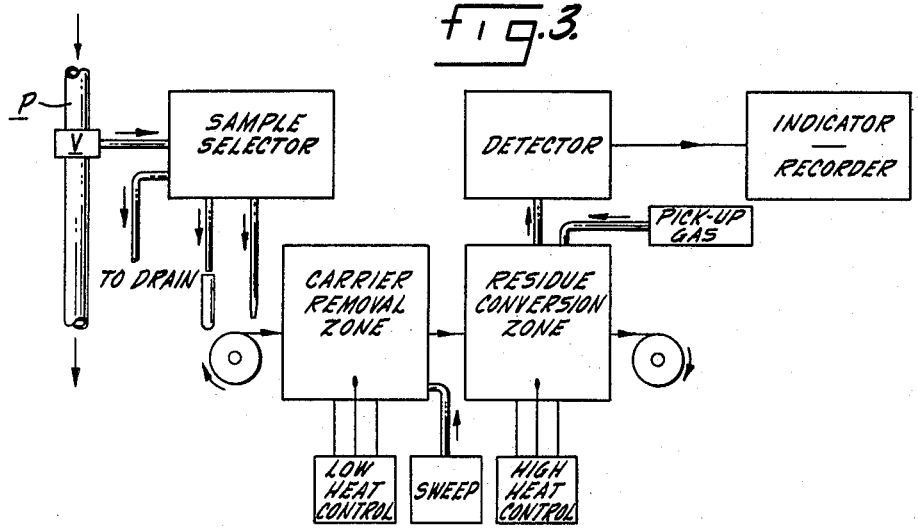
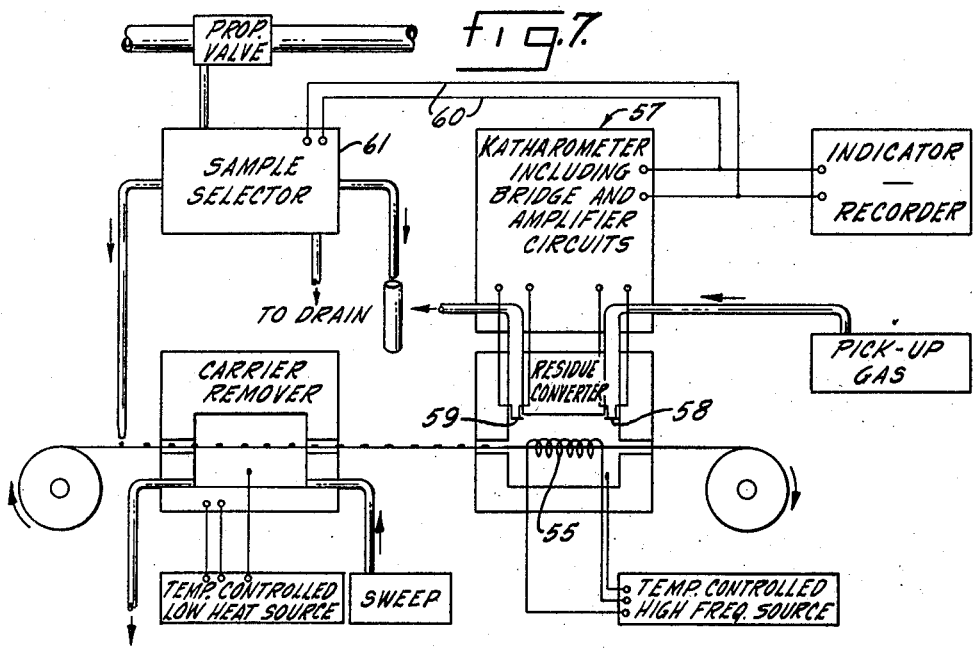

United States Patent Office 3,128,619
Patented Apr. 14, 1964

3,128,619
METHOD OF AND APPARATUS FOR MONITORING FOR FLOWING STREAM CONTENT
Seymour Lieberman, Flushing, N.Y., assignor to Packard Instrument Company, Inc., Lyons, Ill., a corporation of Illinois
Filed Mar. 24, 1961, Ser. No. 98,230
11 Claims. (Cl. 73—23)

The present invention relates generally to the determination of the presence of material in a flowing fluid stream and more particularly to the detection and analysis of components of such material.

The invention finds particular though by no means exclusive utility in continuously monitoring the content of flowing streams. For example, in a typical laboratory the use of chromatographic columns for the separation of multiple-component mixtures is a relatively common procedure. In carrying out this procedure, generally there are collected a large number of fractional samples. Of this number only a few samples are significant, yet in order to determine which fractional samples are of interest it has heretofore usually been necessary to assay individually each fractional sample. Furthermore, it is usually necessary to devise an individual test suitable for each component of the mixture. Thus, if amino acids are being separated the ninhydrin test is employed. If fatty acids are being separated titration procedures are employed. If physiological activity is being observed, it is often necessary to effect biological tests. On occasion, for one complete separation procedure the foregoing may entail many hundreds of individual determinations. It is apparent, therefore, that this is time-consuming, and in many instances prohibitively slow.

By way of further example, there are chemical processes and mechanical operating procedures which are carried on continuously. While normal operating conditions usually prevail, from time to time departures are experienced. Ordinarily, to detect such departures various procedures are employed utilizing what might be termed spot-checking or periodic sampling together with subsequent analysis to determine the departure and to indicate operational modifications necessary to restore normal operating conditions. At best these procedures are slow and often irreparable damage occurs before the departure is determined and corrected. One instance of a mechanical operation in which departure from normal operating conditions can be destructive comprises the operation of turbines involving the supply of a stream of fluid such as steam to the turbines and conveying away spent fluid. One of the first indications of excessive turbine shaft bearing wear is the erosion of shaft seals. As a result minute particles of the shaft seal packing material appears in the spent fluid that is discharged from the turbine. This material usually is so minute, at the beginning at least, as to pass unnoticed. Yet, if it could be detected, excessive bearing wear would be promptly indicated and corrective procedures instituted before serious damage could occur.

The foregoing is indicative of but a few of many operating procedures involving flowing fluid streams and some of the present objections attending them.

It is a general object of the present invention to effect continuous monitoring of flowing fluid streams so as to indicate the presence at a particular moment of material dissolved or suspended therein.

It is a further object of the invention to obviate the necessity of devising separate tests to ascertain whether or not materials are contained in a flowing fluid stream and thereby eliminate the need to analyze fractional samples containing no such material.

A further and related object of the invention is to provide for the monitoring of a flowing fluid stream for indicating not only the presence of but the order of magnitude of material carried in a flowing fluid stream. If the flowing fluid stream comprises a previously defined admixture, then it is an object to provide an indication of that particular component of the admixture which is passing in the stream at a particular moment.

A more specific object lies in the provision of a method of and an apparatus for continuously monitoring an aliquot portion of a flowing fluid stream for utilization with any typical gas chromatography mass detector to provide an indication of the content of the stream.

The objects of the invention thus generally set forth will be more fully understood from the following description taken in conjunction with the accompanying drawings, in which:

FIGURE 1 is a diagrammatic representation of an illustrative apparatus for practicing the present invention.

FIG. 1a is a fragmentary view partly in section of an exemplary control valve for inclusion in the illustrative apparatus for practicing the present invention.

FIG. 2 is a representative plot against time or volume of fluid flow of the mass constituents dissolved or suspended in the fluid.

FIG. 3 is a schematic representation of the invention as utilized for monitoring a flowing fluid stream of a continuous process.

FIGS. 4, 5 and 6 are fragmentary perspective views of various forms of conveyor elements for use in the illustrative apparatus.

FIG. 7 is another schematic representation of the invention incorporating certain modifications.

While the invention has been illustrated and described herein in connection with certain preferred embodiments, it is to be understood that it is not intended thereby to limit the invention to such embodiments. On the contrary, it is intended to cover various alternatives and equivalents as are embraced within the spirit and scope of the invention as expressed in the appended claims.

Referring more particularly to the drawings, there is shown for purposes of illustration a diagrammatic representation of a conventional liquid chromatographic column 10. Into the top of the column is introduced a specimen which is usually a solution of many components, and it is to be resolved into its individual constituents which are to be analyzed. The column is then developed, as is customary and well known in the art, by passing through it various eluents such as an organic solvent, a mixture of organic solvents, water, or aqueous solutions of salts or other agents. These are added from a reservoir 12. As the flow of eluent is continued separation of the components of the specimen is effected. These emerge from the column along with the eluent in sequence as indicated generally in FIG. 2. There it will be seen that the mass of the material passing from the column is plotted against volume of eluent or against time. In the illustrative example it is apparent that materials separated emerge from the column after different volumes of eluent have passed through the column, or in other words, at different times. Obviously there are times when the eluent from the column contains no eluted material. Knowing when the components are emerging from the column is extremely useful and can be used, for example, to determine when samples are to be collected. When this is desired, fractional samples can be collected in suitable receptacles such as test tube 14 for subsequent definitive testing.

For this purpose the column 10 in FIG. 1 is shown diagrammatically as discharging by way of a manifold 16 with an outlet line 18, and a sampling line 19 arranged for directing fluid flow to the receptacle 14. During intervals when there is nothing of interest contained in the eluent stream from the column, the stream can be diverted by way of the outlet line 18.

In accordance with the present invention there is provided a method of and an apparatus for continuously monitoring a flowing fluid stream to denote the presence in the stream's carrier fluid of significant amounts of dissolved or suspended components or constituents. Thus the invention contemplates the continuous separation of a portion of the stream (which may be all or a fraction thereof), depositing that portion upon a conveyor for movement into a first zone wherein the carrier fluid is removed. From the carrier removal zone the conveyor is traversed through a second zone wherein at least a portion of any residue left upon the conveyor is converted to gaseous state, or phase, for entrainment in a pick-up gas. The pick-up gas transports any entrained gas to a mass detector where its presence is effectively indicated.

The output signal from the mass detector permits of utilization in numerous ways including, for example, application to an appropriate recording instrument. Desirably, therefore, the separated part of the fluid stream is an aliquot portion so that the resulting curve plotted by the recording instrument not only indicates presence of stream constituents other than the carrier, which had originally been dissolved or suspended in the carrier, but it also provides a basis for approximation of the quantity of such constituents, especially when they have been previously defined.

Referring again to FIG. 1, a portion of the fluid stream from the column is continuously drawn from the manifold 16 by way of a conduit 20. To receive and transport the bled-off stream portion, a conveyor 22 is provided. While the conveyor 22 may take various forms it has been shown as including a ribbon or tape 23 which is fed from a supply reel 24 to a remote take-up reel 25.

Upon its deposit upon the conveyor 22, the portion of the stream is first treated to remove the carrier fluid and leave as residue on the conveyor any other components of the stream. Thus a carrier removal section 26 is provided which includes a chamber 28 which is traversed by the conveyor 22. The chamber 28 is maintained at a relatively low temperature to evaporate the carrier fluid of the stream portion upon the conveyor. For this purpose the section 26 is shown as including an electric heating coil 30 which is energized from a suitable source 31 under the control of a temperature sensing element 32 disposed within the chamber 28. A temperature within the chamber 28 in the range of 40° C. to 140° C. has been found to be effective for vaporizing usually-encountered carrier fluids without affecting other stream components.

Desirably the vaporized carrier is removed from the chamber 28, and this can be effectively accomplished by sweeping the chamber with dry air, or an inert gas. Alternatively, the gasified carrier can be removed by evacuating the chamber 28. Thus the chamber is provided with an inlet line 34 and an exhaust line 35.

After leaving the carrier removal zone the conveyor 22 bearing any residual components of the stream portion moves into a zone of relatively high temperature for converting at least a portion of such residue into gas phase, which is the next step in the method aspect of the present invention. Thus the apparatus incorporates a residue converting section 36 which includes a chamber 38 constructed and arranged to be traversed by the conveyor 22. The chamber 38 is maintained at a relatively high temperature so as to volatilize or pyrolyze and decompose at least a part of any residue borne by the conveyor.

As shown the residue conversion section includes an insulated metal core 40 defining the chamber 38 through which the conveyor 22 is traversed in its travel to the takeup reel 25. The core 40 is preferably of considerable mass to aid in temperature stabilization and may be heated by a coil 41. The coil 41 is energized from a source 42 under the control of an appropriate temperature sensing element 44 disposed within the chamber 38. It has been found that a temperature within the range of 140° C. to 600° C. will effect volatilization or pyrolization and decomposition of residues on the conveyor.

It is contemplated that in the practice of the present invention a conventional gas chromatography mass detector will be utilized. Among those that might be employed are the Katharometer, the argon ionization detector, the gas density balance, and the hydrogen flame detector. Such a device is indicated generally at 45 in the drawings.

To transport the gasified residue or residue portion to the detector 45, a pick-up gas is used. This gas may be a gas such as argon or helium, or hydrogen if a hydrogen flame detector is utilized as the detector 45. For this purpose the pick-up gas is supplied to the chamber 38 by an inlet line 46. In the chamber 38 any gasified residue or decomposition product is entrained in the pick-up gas and is conducted from the chamber through an outlet passage 48 to the detector 45. Operating in its usual manner the detector will denote the presence and absence in the pick-up gas of any other material entrained therein. The output of the detector 45 may be applied to an appropriate indicating and recording instrument 50.

While the foregoing description has for exemplary purposes been related generally to the monitoring of the outflow from a liquid chromatographic column it will be apparent that the invention possesses wide utility. It is of especially practical usefulness in the monitoring of the flowing fluid streams of continuous industrial processes. Thus in FIG. 3, the invention is diagrammatically depicted for the monitoring of the content of a continuously flowing fluid stream in a line P. From a proportioning valve V inserted in the line P an aliquot portion of the fluid stream is diverted to a sample selector. The sample selector can be constructed and arranged to bleed-off a small fraction for continuous application to a conveyor such as the conveyor 22 of FIG. 1. The laden conveyor sequentially traverses a low-temperature carrier fluid removal zone and then a high temperature residue conversion zone so as to convert into gas phase any constituent of the stream in addition to the carrier fluid. Any such gas is entrained in a pick-up gas which is passed through the latter zone to conduct the same to a suitable detector and its associated indicator and recorder.

Preferably the conveyor 23 is fashioned of a relatively inert and temperature resistant substance such as Nichrome, asbestos or glass fiber. It can take numerous forms of which examples are fragmentarily shown in FIGS. 4, 5 and 6. In FIG. 4, the conveyor is shown in the form of a ribbon or tape 23A of slightly concave cross-section. The conveyor form shown in FIG. 5 comprises a generally flat tape 23B or strip having a longitudinally-spaced series of shallow depressions or cups 23b formed therein for receiving and containing therein droplets of the stream fluid. The third one of the conveyor forms is that shown in FIG. 6 which comprises a ribbon 23C fashioned of asbestos or glass fibers supported by Nichrome strands.

It is desirable that the conveyor include a metallic conductor so as to permit of induction heating. Such a heating arrangement is incorporated in the modified apparatus shown in FIG. 7. Therein the sample selector, conveyor, carrier remover elements are substantially the same as those of the preceding figures. For converting any residue upon the conveyor in gas phase an induction coil 55 is provided. The coil 55 is energized from a suitable source of alternating current under the control of an appropriate temperature sensing element disposed within the conversion chamber. The coil 55 is disposed with its axis substantially coincident with path of travel of the conveyor so as to effect heating thereof by way of eddy currents.

This form of the invention utilizes a Katharometer 57 as the detecting device. Thus two gas conductivity elements 58 and 59 are provided. These elements are respectively located in the pick-up gas inlet line and in the residue converter outlet line. The elements 58 and 59 are connected within the Katharometer in a bridge circuit and serve to denote component presence as a result of variation of gas conductivity of the gas input to and output from the residue conversion chamber. Any variation is manifested in an amplified output signal applied to a suitable indicator and recording instrument. If desired the output signal from the Katharometer mass detector can also be applied by way of conductors 60 to effect operation of a solenoid valve 61 to operate the same automatically to effect fractional sample collection upon detection of the presence in the stream of significant amounts of material in addition to the carrier fluid.

I claim as my invention:

1. A monitor for a flowing fluid stream including a carrier fluid and possibly additional components dissolved or suspended therein, said monitor comprising, in combination, a conveyor, means for depositing upon said conveyor at least a portion of said stream, a carrier removal section including a chamber traversed by said conveyor and maintained at a relatively low temperature for removing the carrier fluid and leaving as residue upon said conveyor any components of the stream in addition to the carrier fluid, a residue converting section including a second chamber traversed by said conveyor and including means for converting any residue upon said conveyor into gas phase, and means for conducting any such gas to a mass detector to denote the presence in the flowing fluid stream in significant quantities of components in addition to carrier fluid.

2. A monitor for a flowing fluid stream including a carrier fluid and possibly additional components, said monitor comprising, in combination, a conveyor, means for depositing upon said conveyor at least a portion of said stream, a carrier removal section including a chamber traversed by said conveyor and maintained at a relatively low temperature for removing the carrier fluid and leaving as residue upon said conveyor any components of the stream in addition to the carrier fluid, a residue converting section including a second chamber traversed by said conveyor and including means for raising the temperature therein sufficiently to convert at least a portion of any residue upon said conveyor into gas phase, and means for conducting any such gas to a gas chromatography mass detector for denoting the presence of components in addition to the carrier.

3. A monitor for a flowing fluid stream including a carrier fluid and possibly additional components, said monitor comprising, in combination, a conveyor including substantially inert metallic members, means for depositing upon said conveyor an aliquot portion of said stream, a carrier removal section including a chamber traversed by said conveyor and maintained at a relatively low temperature for removing the carrier fluid and leaving as residue upon said conveyor any components of the stream in addition to the carrier fluid, a residue converting section having a second chamber traversed by said conveyor and including an induction coil traversed by said conveyor for converting by induction heating any residue upon said conveyor into gas phase, means for conducting any such gas to a detector for indicating the presence in the flowing fluid stream of components dissolved or suspended in the carrier fluid.

4. An apparatus for use with a mass detector for monitoring a flowing fluid stream to denote the presence of components therein, said apparatus comprising, in combination, a carrier fluid removal section, a residue converting section, a moving conveyor tranversing said sections in sequence, and means for collecting at least a portion of the stream and continuously depositing a portion thereof upon said conveyor, said means including a valve for alternatively directing the remainder of said portion to fractional sample collecting means or to drain, said first section including a chamber and means for maintaining the same at a relatively low temperature for removing carrier fluid from said conveyor and leaving other components of the stream as residue on said conveyor, said residue converting section including a second chamber and means within said chamber for producing a relatively high temperature for transforming at least a portion of any residue on said conveyor into gas phase, and means for passing a pickup gas through said second chamber for entraining any gas from a residue and conducting the same to the mass detector for indicating the presence of components other than the carrier fluid in the stream whereby to signal the operation of said valve into position for collection of fractional samples of interest.

5. An apparatus for monitoring a flowing fluid stream to denote the presence of components therein, said apparatus comprising in combination, a carrier fluid removal section, a residue converting section and a moving conveyor traversing said sections in sequence and means for collecting at least a portion of the stream and continuously depositing a portion thereof upon said conveyor, said means including a valve for alternatively directing the remainder of said portion to fractional sample collecting means or to drain, said first section including a chamber and means for maintaining the same at a relatively low temperature for removing carrier fluid from said conveyor and leaving other components dissolved or suspended in said collected sample as residue on said conveyor, said residue converting section including a second chamber maintained at a relatively high temperature for transforming at least a portion of any residue on said conveyor into gas phase, a gas chromatography mass detector, means for passing a pickup gas through said second chamber for entraining any gas from the residue and conducting the same to said detector for providing an output signal indicating the presence in the stream of components other than the carrier fluid, and means responsive to change of output signal from said detector for operating said valve.

6. An apparatus for use with a mass detector for monitoring a flowing fluid stream to denote the presence of components dissolved or suspended in the carrier fluid thereof, said apparatus comprising, in combination, a conveyor, means for diverting at least a portion of said stream and depositing the same upon said conveyor, means including a first chamber maintained at a relatively low temperature and traversed by said conveyor for removing the carrier fluid from said conveyor, means including a second chamber maintained at a relatively high temperature and traversed by said conveyor for converting into gas phase at least a portion of the residue on said conveyor, and means for directing a pickup gas through said second chamber for entraining any gas from said residue and conveying the same to a gas chromatography mass detector whereby to denote component presence in the flowing fluid stream.

7. The method of monitoring a flowing fluid stream including a carrier fluid comprising the steps of separating an aliquot portion of the stream, depositing the stream portion upon a moving conveyor, traversing the laden conveyor into a first zone and therein converting the carrier fluid into gas phase and leaving any residue upon said conveyor, sweeping said first zone to remove the gasified carrier, traversing said conveyor with said residue thereon into a second zone and therein converting by pyrolysis at least a portion of said residue into gas phase, passing a pickup gas through said second zone for entraining any gas from said residue, conducting the pickup gas and any entrained gas to a detector for indicating the presence of any entrained gas therein whereby to denote component presence in said stream.

8. The method of monitoring a flowing fluid stream which includes a carrier fluid for denoting the presence of any dissolved or suspended material in the stream, said method comprising the steps of separating at least a portion of the stream, depositing that portion upon a moving conveyor, traversing the laden conveyor into a first zone and therein converting the carrier fluid into gas phase and leaving any residue upon said conveyor, traversing said conveyor with said residue thereon into a second zone and therein converting at least a portion of said residue into gas phase, conducting any of said residue gas to a detector for indicating the presence of any component in said stream.

9. The method of monitoring a flowing fluid stream including a carrier fluid and any dissolved or suspended components, which method comprises depositing at least a portion of said stream upon a moving conveyor, traversing the laden conveyor into a first zone and therein removing the carrier fluid and leaving any other components as residue upon said conveyor, traversing said conveyor with said residue thereon into a second zone and therein converting by volatlilization at least a portion of said residue into gas phase, passing a pickup gas through said second zone for entraining any gas from said residue, conducting the pickup gas and any entrained gas to a detector for producing a signal indicating the presence of any gas in addition to the pickup gas, and utilizing said signal for effecting sample collection for subsequent definitive analysis.

10. The method of monitoring a flowing fluid stream including a carrier which comprises the steps of depositing upon a moving conveyor droplets from said stream, transferring said droplets by said conveyor into a zone of relatively low temperature and therein removing the carrier, transferring any residue on said conveyor into a relatively high temperature zone and converting at least a portion thereof into gas phase, entraining said gas in a pickup gas, and detecting the same for indicating component presence in said stream.

11. The method of monitoring a flowing fluid stream including a carrier comprising the steps of continuously collecting at least a portion of the stream, depositing the same upon a conveyor, traversing the laden conveyor through a first zone and therein removing the carrier fluid and leaving any residue upon the conveyor, traversing the conveyor into a second zone and therein converting at least a portion of any residue into gas phase, and conducting the gas to a detector for indicating the presence thereof so as to signal the passing in the stream of significant quantities of constituents in addition to the carrier fluid.

References Cited in the file of this patent

UNITED STATES PATENTS

| | | |
|---|---|---|
| 2,370,817 | Shanley | Mar. 6, 1945 |
| 2,408,964 | Winn et al. | Oct. 8, 1946 |
| 2,429,555 | Langford et al. | Oct. 21, 1947 |
| 2,692,820 | Alway et al. | Oct. 26, 1954 |

FOREIGN PATENTS

| | | |
|---|---|---|
| 818,703 | Great Britain | Aug. 19, 1959 |

OTHER REFERENCES

Article: Qualyzing Hydrocarbon Mixtures by Podbielniak et al., published in Oil & Gas Journal, April 16, 1956, pp. 211, 212, 215, 216.